US010025941B1

(12) United States Patent
Griffin et al.

(10) Patent No.: US 10,025,941 B1
(45) Date of Patent: Jul. 17, 2018

(54) DATA ELEMENT TOKENIZATION MANAGEMENT

(71) Applicant: Wells Fargo Bank, NA, San Francisco, CA (US)

(72) Inventors: Phillip H. Griffin, Raleigh, NC (US); Jeffrey J. Stapleton, Arlington, TX (US)

(73) Assignee: WELLS FARGO BANK, N.A., San Francisco, CA (US)

( * ) Notice: Subject to any disclaimer, the term of this patent is extended or adjusted under 35 U.S.C. 154(b) by 52 days.

(21) Appl. No.: 15/244,915

(22) Filed: Aug. 23, 2016

(51) Int. Cl.
G06F 21/00 (2013.01)
G06F 21/62 (2013.01)

(52) U.S. Cl.
CPC .................. G06F 21/6209 (2013.01)

(58) Field of Classification Search
CPC .................................................. G06F 21/6209
See application file for complete search history.

(56) References Cited

U.S. PATENT DOCUMENTS

| 9,177,175 | B2* | 11/2015 | Margolus | G06F 17/30097 |
| 2003/0196087 | A1* | 10/2003 | Stringer | G06F 21/6209 |
| | | | | 713/171 |
| 2009/0048997 | A1* | 2/2009 | Manickam | G06F 21/62 |
| | | | | 706/47 |
| 2010/0185855 | A1* | 7/2010 | Margolus | G06F 17/30097 |
| | | | | 713/165 |
| 2014/0281535 | A1* | 9/2014 | Kane | H04L 63/0428 |
| | | | | 713/168 |

OTHER PUBLICATIONS

American National Standard for Financial Services, ANSI X9.119-2016, Retail Financial Services—Requirements for Protection of Sensitive payment Card Data—Part 2: Implementing Post-Authorization Tokenization Systems, 2016. 67 pages.
American National Standard for Financial Services, ANSI X9.73-2010, Cryptographic Message Syntax-ASN.1 and XML, Apr. 15, 2010, 89 pages.

* cited by examiner

*Primary Examiner* — Mahfuzur Rahman
(74) *Attorney, Agent, or Firm* — Foley & Lardner LLP

(57) ABSTRACT

Systems and methods to manage a tokenization manifest that can be used for managing a redaction through tokenization of a set of field level tokenization values applied to an arbitrary information object of an arbitrary file (e.g., database cells, XML and other document elements, areas of graphics images, etc.). The methods and system extend the use of tokenization to the protection of arbitrary fields or information objects of any type or format. This allows the tokenized components of the information object to be located and provided to a Tokenization Service Provider that can recover, for an authorized requestor, the original content protected by the token. The tokenization schema processes the unrestricted content into a corresponding restricted token. The token can include an embedded URL, where the URL is a link to submit a request to the Tokenization Service Provider to view the token as the unrestricted content.

16 Claims, 9 Drawing Sheets

402 EMPLOYMENT APPLICATION

404 Company: ABC Corporation

406 — {
    Name: John Doe

Date of Birth: 05/15/1965

SSN: 000-000-0000
}

408 Form #/Generated: #464, 01/12/16

410 Comments: These comments are in regard to the applicant on December 25$^{th}$ 2015 who met with the Senior VP of Technology....

FIG. 4A

402 EMPLOYMENT APPLICATION

404 Company: juhvwqsd21wdeqihubj87187//:tsp2.com/request

Name: John Doe

406 — Date of Birth: 05/15/1965

SSN: 000-000-0000

408 Form #/Generated: #464, 01/12/16

412 Comments: ysdv76123uibsd837246ybi9832ybr7b3489//:tsp1.com/request

FIG. 4C

```
TokenizationManifest { iso(1) identified-organization(3) tc68(133) country(16) x9(840) x9Standards(9) x9-73(73) module(0) tm(7) }
DEFINITIONS AUTOMATIC TAGS ::= BEGIN
-- EXPORTS All --
IMPORTS
  -- X9.73 Cryptographic Message Syntax (CMS) --
  ATTRIBUTE
    FROM CryptographicMessageSyntax {
        iso(1) identified-organization(3) tc68(133) country(16) x9(840)
          x9Standards(9) x9-73(73) module(0) cms(2) v2009(1) }
  -- X9.73 CMS Object Identifiers --
  id-tokenizedParts, id-XPathTokensSet
    FROM CMSObjectIdentifers {
        iso(1) identified-organization(3) tc68(133) country(16) x9(840)
          x9Standards(9) x9-73(73) module(0) oids(1) v2009(1) };

TokenizedParts ::= Tokenized {{ Manifest }} imageTokensManifest TOKENIZED ::= { OID id-ImageTokensSet PARMS ImageTokensSet}

ImageTokensSet ::= SEQUENCE SIZE(1..MAX) of ImageTokensSetItems

ImageTokensSetItems ::= RELATIVE-OID -- In x1 y1 x2 y2 format

Manifest TOKENIZED ::= {
  xPathTokensManifest |
  imageTokensManifest,
  -- Expect additional manifest objects --} xPathTokensManifest TOKENIZED ::= {OID id-XPathTokensSet PARMS XPathTokensSet}

XPathTokensSet ::= SEQUENCE SIZE(1..MAX) of XPathTokensSetItems

XPathTokensSetItems ::= SEQUENCE { tSP , TokenServiceProvider OPTIONAL,   xPathSet  XPathSet}

TokenServiceProvider ::= QueryString
-- A value of type QueryString supports both the http (Hypertext Transfer Protocol and https (http over Secure Sockets Layer)
URL schemes defined in IETF RFC 2396.--

QueryString ::= UTF8String SIZE(1..MAX)

XPathSet ::= SEQUENCE SIZE(1..MAX) OF XPath

XPath ::= UTF8String (CONSTRAINED BY {-- XML Path Language 2.0 --})

tokenizedParts ATTRIBUTE ::= {  WITH SYNTAX TokenizedParts ID id-tokenizedParts}

TokensManifest ATTRIBUTE ::= { tokenizedParts,
  ... -- Expect additional types of manifest objects --}

TOKENIZED ::= CLASS {
  &id OBJECT IDENTIFIER UNIQUE,
  &Type OPTIONAL
}
  WITH SYNTAX { OID &id [ PARMS &Type ] }

Tokenized { TOKENIZED:IOSet } ::= SEQUENCE {
  name  TOKENIZED.&id({IOSet}),
  parts TOKENIZED.&Type({IOSet}{@name}) OPTIONAL
}
END -- TokenizationManifest --
```

FIG. 6

```
Token ::= OCTET STRING (CONTAINING NestedTokens)

NestedTokens ::= SEQUENCE {
    tokenDepth  INTEGER DEFAULT 1,
    tokenSet    OCTET STRING (SIZE(1..MAX))  -- Simple value or nested set
}
```

FIG. 7

DATA ELEMENT TOKENIZATION MANAGEMENT

BACKGROUND

Tokenization is a process in which a token is substituted as a proxy for data thereby obscuring the underlying data. Accordingly, a token is a surrogate value that can be used to replace some underlying sensitive value. For example, a token may be issued as a proxy for a credit or debit card primary account number ("PAN") such that the token is processed during a transaction instead of the actual PAN, thereby protecting the PAN from disclosure during the transaction. The tokens may be generated, stored, and maintained by an entity that specializes in the tokenization process. This entity may be a Tokenization Service Provider ("TSP"), as described in the X9.119-2 standard, that would handle receiving requests to tokenize data and detokenize a token to reveal the corresponding data for an authorized party and/or subscriber of the TSP's services. A token can be made to look very similar to the underlying data that it is serving as a proxy for such that that no reconfiguration of systems is required (i.e., the token is "format preserving"). In the example where the token serves as a proxy for a PAN, the token may have the same format (e.g., a string of sixteen numbers) such that the token can be accepted by existing payment systems. The mapping of underlying sensitive values to tokens does not have to be one-to-one. As in the example above, different tokens could replace the same PAN in two separate data repositories. A token attribute may share a common value with the original underlying value it is replacing or be specific to the token itself. For example, the token may share the structure of that value, (i.e., the length and character set) or a mechanism to determine that the token is actually a token (i.e., actually represents a replacement value rather than the original underlying value).

SUMMARY

Various arrangements relate to a method performed by a processor of a TSP computing system. The processor is configured to receive a file and a redaction service call. The redaction service call includes a plurality of information object identifiers that need to be redacted. Each information object identifier corresponds to unrestricted content in the file and each object identifier has a desired output of the redacted information object identifiers. A tokenization manifest is generated. The tokenization manifest includes the plurality of information object identifiers, a tokenization schema, and a plurality of tokenization components. The tokenization components are the identified plurality of information object identifiers and information related to a location of each of the plurality of information object identifiers. The identified information object identifiers are tokenized using the tokenization schema. The unrestricted content is tokenized into the corresponding restricted token. The file with the identified information object identifiers as tokens in place of the underlying unrestricted data that the tokens redact is transmitted.

Various other arrangements relate to a TSP computing system. The TSP computing system includes a network interface and a processor and instructions stored in non-transitory machine-readable media. The instructions configured to cause the redaction tokenization system to receive a file and a redaction service call. The redaction service call includes a plurality of information object identifiers that point to unrestricted data that needs be redacted. Each information object identifier corresponds to unrestricted content in the file and each object identifier has a desired output of the redacted information object identifiers. A tokenization manifest is generated. The tokenization manifest includes the plurality of information object identifiers, a tokenization schema, and a plurality of tokenization components. The tokenization components are the identified plurality of information object identifiers and information related to a location of each of the plurality of information object identifiers. The identified information object identifiers are tokenized using the tokenization schema. The unrestricted content is tokenized into the corresponding restricted token. The file with the identified information object identifiers as tokens in place of the underlying data that the tokens redact is transmitted.

These and other features, together with the organization and manner of operation thereof, will become apparent from the following detailed description when taken in conjunction with the accompanying drawings, wherein like elements have like numerals throughout the several drawings described below.

BRIEF DESCRIPTION OF THE FIGURES

FIGS. 4A-C are an employment application at various instances through the tokenization method, according to an example embodiment.

FIG. 6 is a redaction tokenization manifest schema, according to an example embodiment.

FIG. 7 is a nested tokens schema, according to an example embodiment.

DETAILED DESCRIPTION

Figure 1:
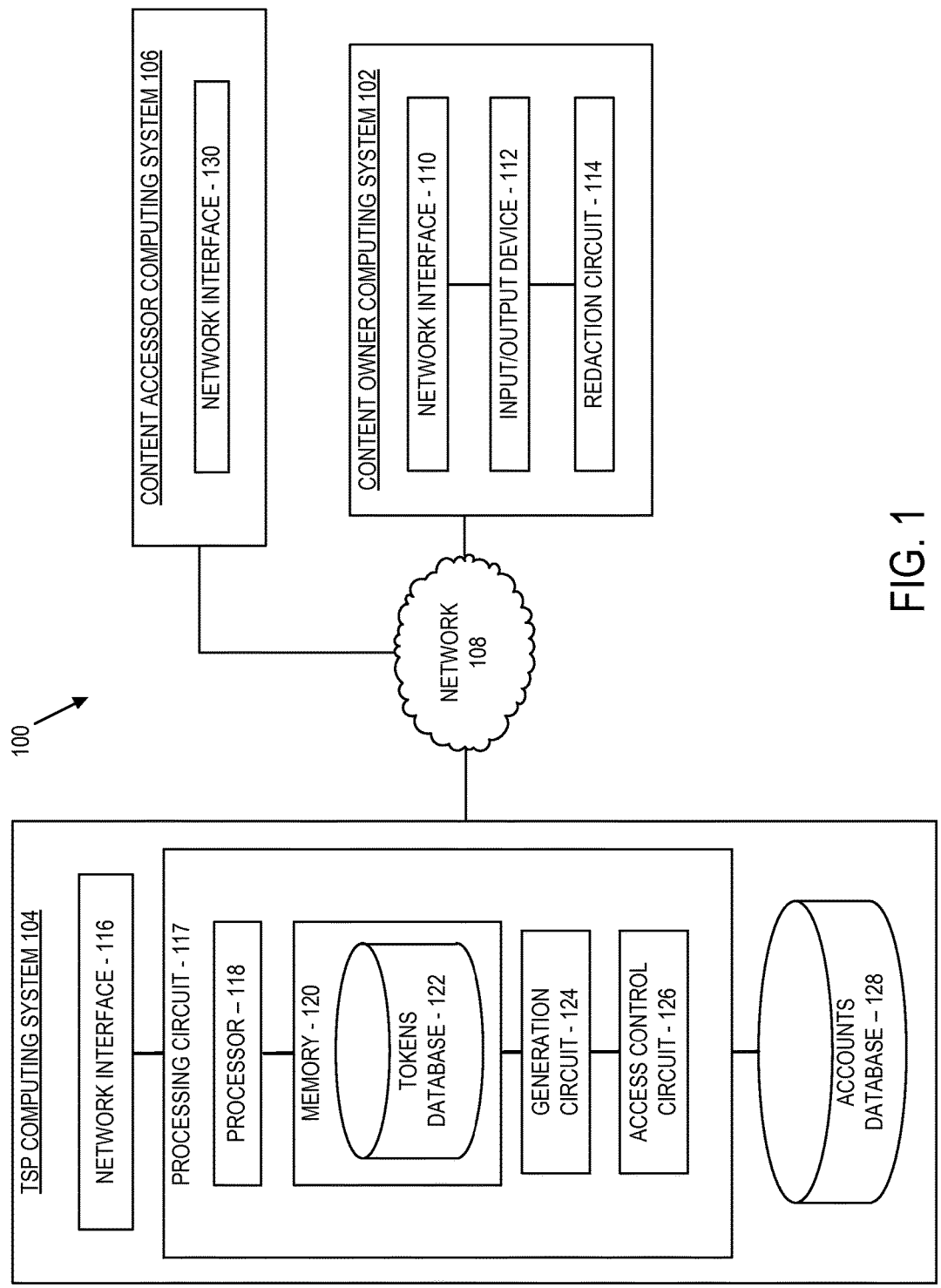
FIG. 1 is a schematic diagram of a tokenization redaction service system, according to an example embodiment.

Referring generally to the Figures, systems, and methods, a data element tokenization system and method provide for redaction of at least a portion of data files by selectively or randomly tokenizing data within the data file are described. The data element tokenization system and methods allow for a content owner to upload a data file and determine exactly how the content in the file is redacted through tokenization (e.g., selecting content, randomizing the redaction, etc.) and what access controls are placed on the tokenized content (e.g., one password for all redacted content, each tokenized content has an specific access control, etc.). Generally, to use the data element tokenization system, a content owner opens a file (e.g., a text file, image file, media file, etc.), selects the data elements to tokenize (e.g., words, portions of the image, portions of a video file, audio from a media file, etc.), and the selected data elements remain in the tokenized format until a user who is authorized opens up the tokenized file, logs in, and receives the original data elements. For example, using the system, a content owner opens up an image file of a picture, selects that the heads of the people in the photo that are tokenized out, and determines the access controls for each of the tokenized portions of content. Subsequently, an authorized user receives the file, provides credentials to the TSP, and receives the original image file (e.g., detokenized).

The data element tokenization management provides for the protection of arbitrary (e.g., random) fields of information or selected (i.e., content owner specified) information objects of any type or format to be tokenized. The data element tokenization system does not require the data file to be of a specific type (e.g., database cells, XML and other document elements, areas of graphics images, etc.), rather the system identifies a plurality of data components (e.g., data elements, object identifiers, field-level components, etc.), tokenizes the selected data components, and utilizes a digital signature to bind their locations within information objects. When the signature is based on a certificate in a Public Key Infrastructure ("PKI"), the binding allows the origin authenticity of the signer to be determined. A digital signature of the information cryptographically binds a tokenization manifest (containing information regarding the tokenization process and access control) to the object containing tokenized components. The digital signature allows accidental or malicious modifications to the object or its manifest to be detected, thereby providing data integrity and authenticity of the object and manifest source. The data element tokenization system and methods allows the tokenized components of the information object to be located and provided to a TSP who can recover, for an authorized requestor, the original content protected by the token. Additionally, the binding mechanism allows for each information object to have object-specific access controls. For example, the tokenized components may contain signed attributes that identify the users and access levels for each user, such that each user either has access to "all" tokens or a listed subset. Alternatively, the TSP may determine the object-specific access controls with the content owner.

Expanding generally, the data element tokenization system and methods include a tokenization manifest that contains a list of identifiable locations in an information object that have been tokenized to replace the sensitive content. The tokenization can be embedded directly in an object or it may be separate from the object (e.g., a detached signed attribute of the object, perhaps stored in a database, or in a Microsoft Active Directory, LDAP, or X.500-series DAP directory). Each file type would typically need a manifest type that would specify how data elements are located. For example, for image files (e.g., jpeg, git, etc.), the manifest may use a coordinate approach to tokenize the format. In some arrangements, the tokenization manifest is cryptographically bound to the information object containing these tokenized values under a digital signature. This signature may be one of the Cryptographic Message Syntax ("CMS") types defined in the X9.73 financial services security standard or a similar CMS standard. The signature and signed manifest attribute may be detached from the information object containing tokenized components. Cryptographic binding allows any modification of the signed object or manifest to be detected (e.g., provides data integrity), and when the signature is based on a certificate in a Public Key Infrastructure (PKI), the binding allows the authenticity of the signer to be determined. Key management techniques in support of asymmetric encryption, such as NamedKeyEncryptedData, SigncryptedData, EnvelopedData, or similar cryptographic message types are used.

The system and methods described herein allow for the confidentiality of multiple occurrences of data within an information object to be protected from unauthorized access using a managed tokenization process that also provides data integrity, origin authenticity, and technical non-repudiation.

The systems and methods address the requirement to protect data even when it is stored in a publically accessible environment, such as the cloud, within a blockchain or distributed ledger, in a flexible way that is file and data element neutral. The generalization of the tokenization manifest allows for subsequent, selective tokenization of any arbitrary data elements of an arbitrary file format in accordance with the file originators request and access control requirements. Additionally, unlike the limited, anonymous signatures supported by existing systems, this tokenization manifest supports single signers, multiple signers, or co-signers to store information publicly without loss of confidentiality of any sensitive content.

The data element tokenization system provides technical solutions to the computer-centric and internet-centric problems associated with conventional data management systems. For example, the data element tokenization system, according to various arrangements, provides a more efficient and effective mechanism to the industry by providing a system that allows for flexible restriction of sensitive content that is stored on a publicly and globally accessible repository of information for periods of time that may exceed the lifetime of encryption techniques, (e.g., sufficient key lengths, trustworthy algorithms, and reliable techniques). This storage is in accordance with industry standards and allows the user to restrict access to data to those with a need-to-know. These problems arise out of the use of computers and the Internet, because cloud services and online repositories cannot exist without the use of computers and the Internet. Accordingly, problems relating to maintaining and protecting data elements on a shared server arise out of computers and the Internet. The data element tokenization system, comprising of a tokenization manifest and user-interface, allows for a more effective and reliable medium for users of a multi-access repository to selectively redact, through tokenization, sensitive information. This tokenization system enables real-time restriction and detokenization of sensitive content, responsive to the authorization credentials in the tokenized document.

As described herein, the term tokenization refers to the process in which a token is substituted as a proxy for data, thereby obscuring the underlying data. Accordingly, a token is a surrogate value that can be used to replace some underlying sensitive value. A token can be made to look very similar to the underlying data that it is serving as a proxy for such that that no reconfiguration of systems is required (i.e., the token is "format preserving"). A token attribute may share a common value with the original underlying value it is replacing or be specific to the token itself. Alternatively, a token may include access request information, for example, the replacement string of data may include a hyperlink to the TSP provider with the ability to provide the original content. As used herein, redaction refers to the conversion of the original data element into an obscure piece of content by means of blurring, blacking out, whiting out, boxing out, removing, substituting, or other mechanisms that make the original data element indiscernible to an unauthorized third-party.

FIG. 1 is a schematic diagram of a data element tokenization system 100, according to an example embodiment FIG. 1. The data element tokenization system 100 includes a content owner computing system 102 associated with a content owner who is a subscriber to the TSP's services, a TSP computing system 104 associated with a TSP, and a content accessor computing system 106 associated with a message receiver or content-accessing entity. Each of the content owner computing system 102, the TSP computing system 104, and the content accessor computing system 106 are in communication with each other via a network 108. The network 108 includes, for example, the Internet, cellular networks, private networks (e.g., a company intranet), and the like.

Generally, a content owner (e.g., the message sender) is subscribed to the TSP's services (or a service that utilizes a TSP to generate, maintain, and store tokens) and uses the data element tokenization system 100 to submit a request to tokenize data elements in a file or document. The content owner may submit the request through a user interface provided by the TSP, in a web browser connected to the TSP computing system 104, or a similar mechanism. The request includes the identified data element(s) to be tokenized, the desired token output type(s), and the authentication level(s) for each requested token. In some arrangements, the content owner may request for the data elements to be randomly selected by the data element tokenization system and tokenized. For example, the data file may be such that if any of the elements or content in the file are tokenized it will be unusable to the content accessor without the proper clearance, therefore the content owner may not care which elements are tokenized, just that some are. The TSP computing system 104 generates the appropriate tokenization manifest to process the file, generate the token(s), associate the authentication level(s) with the token(s), store the original content and authentication information, and transmit the token(s) to the content owner computing system 102 to replace the original content in the file. The content owner computing system 102 sends the redacted, tokenized file to the content accessor (e.g., recipient) computing system 106 which can submit a detokenization request to the TSP computing system 104 and receive the original data elements for which the message receiver is authorized to view.

The content owner computing system 102 includes a network interface 110, an input/output device 112, and a redaction circuit 114. The network interface 110 is structured to facilitate operative communication between the content owner computing system 102 and other systems and devices over the network 108. The content owner computing system 102 may include any of smartphones, tablet computing systems, laptop computing systems, desktop computing systems, PDAs, smart watches, tablets, etc. The input/output device 112 can be used by the content owner to provide redaction details (e.g., which data elements to tokenize, the output of the tokens, the authentication access, etc.) to be carried out by the TSP computing system 104. The input/output device 112 may include a keyboard, a mouse, a touchscreen, a biometric sensor (e.g., a fingerprint sensor), a microphone, a camera, etc.

The redaction circuit 114 is structured to provide the content owner with a user interface to upload a file type and identify the content that needs to be tokenized. Generally, the redaction circuit 114 involves selecting a file for tokenized redaction, (e.g., uploading or opening it in an interface), identifying and selecting the parts of the file that should be tokenized (e.g., point and click, drag and select, randomized, etc.), identifying how the tokenization should occur (e.g., blurred out, random text, black out, etc.) and assigning one or more authenticators (e.g., passcode, user identifier, etc.) for each redacted piece for access control. For example, via the redaction circuit 114, the content owner can upload a JPEG file of an image, select a drag and click option, drag and click to generate shapes to cover the portions of the JPEG file that are sensitive, confirm the selections, and receive a redacted, tokenized JPEG file. The redaction circuit 114 may comprise program logic (e.g., stored executable instructions) structured to cause a processor to implement at least some of the functions described herein. The redaction circuit 114 may be formed at least in part by a web browser (e.g., Safari®, Chrome®, Internet Explorer®, etc.) configured to receive and display web pages received from the TSP computing system 104. In other arrangements, the redaction circuit 114 is formed, at least in part, by a dedicated application (e.g., a smartphone application), a text message interface, or another program executed locally on the content owner computing system 102 suitable for communicating with the TSP computing system 104 over the network 108.

The redaction circuit 114 facilitates the content owner's ability to have any file type, containing any data elements, to be tokenized to the customer-specific request. In some arrangements, the content owner logs into his or her account with the TSP (or entity offering the tokenization redaction service) to initiate the tokenized redaction service. Once authenticated, the content owner uploads a file that contains the data elements. The TSP computing system 104 may be in communication with the redaction circuit 114 such that a tokenization manifest is generated or altered in response to the file type uploaded. The content owner selects the data elements to be tokenized and selects the desired output (e.g., randomized text, blurred out, blacked/whited out. and the like). For example, for a picture the sender is able to drag shapes to cover up portions of the photo that are to be tokenized out, and the tokenized out portion can be black boxes, blurring or the like.

The TSP computing system 104 includes a network interface 116, a processing circuit 117 and an accounts database 128. Generally, the TSP computing system 104 is structured to control the generation of a plurality of tokens for a content owner provided file, replace the original content with the generated tokens, extract a set of access control settings, embed access information into the tokens, and facilitate the retrieval and placement of the original content in accordance with the access control instructions. The TSP computing system 104 could be an entity that offers the tokenization redaction service, and uses an outside TSP to generate, maintain, and store the tokens. For purposes of FIG. 1, the TSP computing system 104 is an entity that offers the tokenization redaction services and tokenization in-house. The network interface 116 is structured to facilitate operative communication between the TSP computing system 104 and other systems and devices over the network 108.

The TSP computing system 104 includes a processing circuit 117 having a processor 118 and memory 120. The processor 118 may be implemented as a general-purpose processor, an application specific integrated circuit (ASIC), one or more field programmable gate arrays (FPGAs), a digital signal processor (DSP), a group of processing components, or other suitable electronic processing components. The memory 120 includes one or more memory devices (e.g., RAM, NVRAM, ROM, Flash Memory, hard disk storage, etc.) that store data and/or computer code for facilitating the various processes described herein. Moreover, the memory 120 may be or include tangible, non-transient volatile memory or non-volatile memory.

The TSP computing system 104 includes a generation circuit 124 and an access control circuit 126. Although FIG. 1 shows the generation circuit 124 and the access control circuit 126 as part of the processing circuit 117, in other arrangements one of or both of the generation circuit 124 and the access control circuit 126 are embodied as separate processing circuits. Other arrangements may include more or less circuits without departing from the spirit and scope of the present disclosure. Further, some arrangements may combine the activities of one circuit with another circuit to form a single circuit. Therefore, those of ordinary skill in the art will appreciate that the present arrangement is not meant to be limiting.

The generation circuit 124 is structured to control the generation of tokens and the replacement of the original content with the generated tokens. The generation circuit 124 receives a file of some type and a redaction request. The redaction request includes the original content that needs to be redacted through tokenization, access control information for the tokens, output style of the tokens, and other information related to the tokens. In some arrangements, the generation circuit 124 is in communication with a redaction application or web browser, such that, when a file is loaded into the interface, the generation circuit 124 generates, in real-time, the appropriate tokenization manifest that allows the content owner to select content to be redacted.

In some arrangements, the tokenization manifest is already associated with a preloaded file type with pre-set tokenization parts. For example, the tokenization manifest may be associated with a plain text file where the second page of any document pasted into the plain text file will be tokenized out. In other arrangements, the file is received along with the redaction instruction and then a tokenization manifest is generated that embodies the redaction instructions and file type.

The generated tokens take the form of a variety of output types and can contain embedded access information. The output of the tokens can be a random number, a string of text, a shape or shading, a phrase, access instructions, a URI with a query string, and the like. For example, the token is a text string of "get original content" with an embedded, clickable URL that initiates an authentication communication between the TSP computing system 104 and the requesting party. The generated tokens are processed to occupy the space previously populated by the unrestricted data elements. In some arrangements, the file is provided with the redaction request and the generation circuit 124 replaces the original content with the tokens in the file and transmits the redacted tokenized file to the content owner. In other arrangements, the tokens are transmitted over the network 108 and replace the original content in the file, the replacement being facilitated by an application, web-browser, etc. on the content owner computing system 102. The generation circuit 124 also is structured to further tokenize an already tokenized document. For example, a content owner A sends to content accessor B, content accessor B wants to send to third-party C but without private information relating to the name of the applicant. Content accessor B can send the already redacted file to get further redacted by interacting with the TSP computing system 104 over the network 108. The generated tokens are stored in a tokens database 122.

In some arrangements, the TSP computing system 104 digitally signs a hash of the file to the tokens generated, such that it can be validated by a relying party. In other arrangements, the TSP computing system 104 digitally signs the tokenization manifest and the redacted file before the TSP transmits the information to the content owner computing system 102. A key management mechanism may be used to achieve the digital signatures. Generally, key management is a method of establishing a key, whereby several components of keying material, both symmetric and asymmetric type of keys, where each component is used for a specific purpose, are combined together using a mathematical function to produce an object key (i.e., the key used to encrypt and decrypt an object). The key management mechanism is focused on the generation, storage, secure distribution and application of keying material. The keying material is the data (e.g., keys, certificates, and initialization vectors) necessary to establish and maintain cryptographic keying relationships. The key management mechanism may use symmetric and asymmetric key pairs or key splits to encrypt or bind content. For example, the user creates a message encryption key at the time of encryption or at the time of decryption by combining the appropriate asymmetric key pair (i.e., two related keys one for encryption and one for decryption) invoked by the credentials associated with each transaction and the symmetric key pair (i.e., same key used for encryption and decryption). In those arrangements, SignedData, NamedKeyEncryptedData, EnvelopedData, and other key management mechanisms may be used. NamedKeyEncryptedData and EnvelopedData are used to provide confidentiality services, and type SignedData is used to provide data integrity and authentication of origin services. For example, a value of type NamedKeyEncryptedData contains content encrypted with a single key and the key name. The name of the key is given in the keyName component. The result of encrypting the content is carried in the encryptedContentInfo component along with an identifier of the encryption algorithm used and the type of content encrypted. Optional, unprotected attributes may also be included. This type allows the sender to identify for the content accessor the encryption key used for protection, so that the sender and content accessor can share a set of established symmetric keys, each having a unique name. The optional key name can be omitted when there is no need for the sender to identify the encryption key. This may occur when a single symmetric key is used, or when the sender and content accessor have agreed in advance how and when a set of keys will be used. Type EnvelopedData supports all of the key management techniques defined in the X9.73 CMS standard. Type SignedData allows the sender to indicate the certificate needed by the content accessor to verify the signature, and may optionally provide any needed certificates or CRLs. SignedData can be used alone or in combination with other cryptographic types. Using SignedData, a digital signature can be added to enhance the content encrypted with NamedKeyEncryptedData or EnvelopedData to provide confidentiality, data integrity and origin authenticity. SignedData supports RSA, ECDSA, and DSA signature schemes.

The access control circuit 126 is structured to process an authentication request from a requesting party. The access control circuit 126 receives an access request for one or more redacted tokenized content pieces, along with authentication information. The request can come from accessing an embedded URL in the token, opening a tokenized file using the redaction application, submitting a tokenized file with authentication information, or similar processes. The access control circuit 126 identifies the redacted tokenized pieces and retrieves the stored access control information for the identified redacted tokenized pieces of content. The access control circuit 126 compares the provided authentication information to the stored access control information and, if the authentication information matches, the access control circuit 126 facilitates the retrieval of the token information from the tokens database 122 to provide the requesting entity with the associated original content. In some arrangements, the access control circuit 126 replaces the original content in the file and transmits the unrestricted file to the requesting entity. In other arrangements, the access control circuit 126 transmits the original content to the content accessor computing system 106 which replaces the tokens with the original content. The access control information is stored on the account database 128. In some arrangements, the access control circuit 126 extracts access information, for example, the requesting entity identity, time of access request, failed access requests, etc. and stores the information in the accounts database 128.

The TSP computing system 104 also includes the tokens database 122. In some arrangements, the memory 120 includes tokens database 122. In other arrangements, the tokens database 122 is a separate data storage device from the memory 120. The tokens database 122 is configured to store tokens generated by the generation circuit 124. The tokens database 122 contains information related to the generation of the tokens, for example, the requesting entity, encryption algorithms used, the original content, processing information, etc. The tokens database 122 is also in communication with access control circuit 126. Once a requesting/content accessor computing system 106 is authorized to access one or more tokens, the tokens database 122 supplies the information for the authorized content. In some arrangements, the tokens database 122 stores any authentication information associated with the token, for example, a plurality of user names and passwords that are allowed to access the tokenized redacted content. In other arrangements, the access information is stored in an accounts database 128.

The accounts database 128 is structured to store the authentication information for a plurality of users. For example, a requesting entity may have a single password with the TSP that allows the requesting entity to detokenize any data it has access to. For example, requestor A could have passcode of "123" with the TSP, any time a content owner is trying to tokenize a file so that requestor A can see it, the content can be tokenized and the token can be associated with that multi-use passcode of requestor A. Additionally, a generated token may be a single use passcode that is sharable to authorized entities or the token could have a list of authorized requestors enrolled with the TSP. For example, a generated token is assigned access control for subscriber A, when subscriber a logs into the TSP service using the log in credentials, subscriber A is given access to the token. The accounts database 128 stores the access control information for the plurality of tokens generated and stored in the tokens database 122. Generally, the accounts database 128 keeps track of all the access points and possibilities for a single token.

The content accessor computing system 106 receives the redacted tokenized file from the content owner computing system 102 over the network 108. The content accessor computing system 106 includes a network interface 130 structured to facilitate operative communication between the content owner computing system 102 and other systems and devices over the network 108. The content accessor computing system 106 is able to view the files and, in some arrangements, they are a subscriber to the services of the TSP and have an account with the TSP. In some arrangements, the redacted tokenized file may be opened using any other applicable software. For example, a tokenized pdf file can be open in a pdf viewer application. If opened in a third-party pdf viewer, the tokenized elements may have a clickable URL embedded that allows for authentication by the content accessor computing system 106. This may require additional submission of the tokenized file, along with the service request, to properly process the file. In some arrangements, the content accessor computing system 106 has a dedicated application that opens the file and organizes the access control request with the TSP computing system 104. For example, upon opening the application and selecting the file, the application extracts the tokens in the file, retrieves the content accessor's authentication information (e.g., a token specific password, a TSP log in, a multi-use password, etc.) and facilitates the retrieval of the original content with the access control circuit 126 of the TSP computing system 104.

Figure 2:
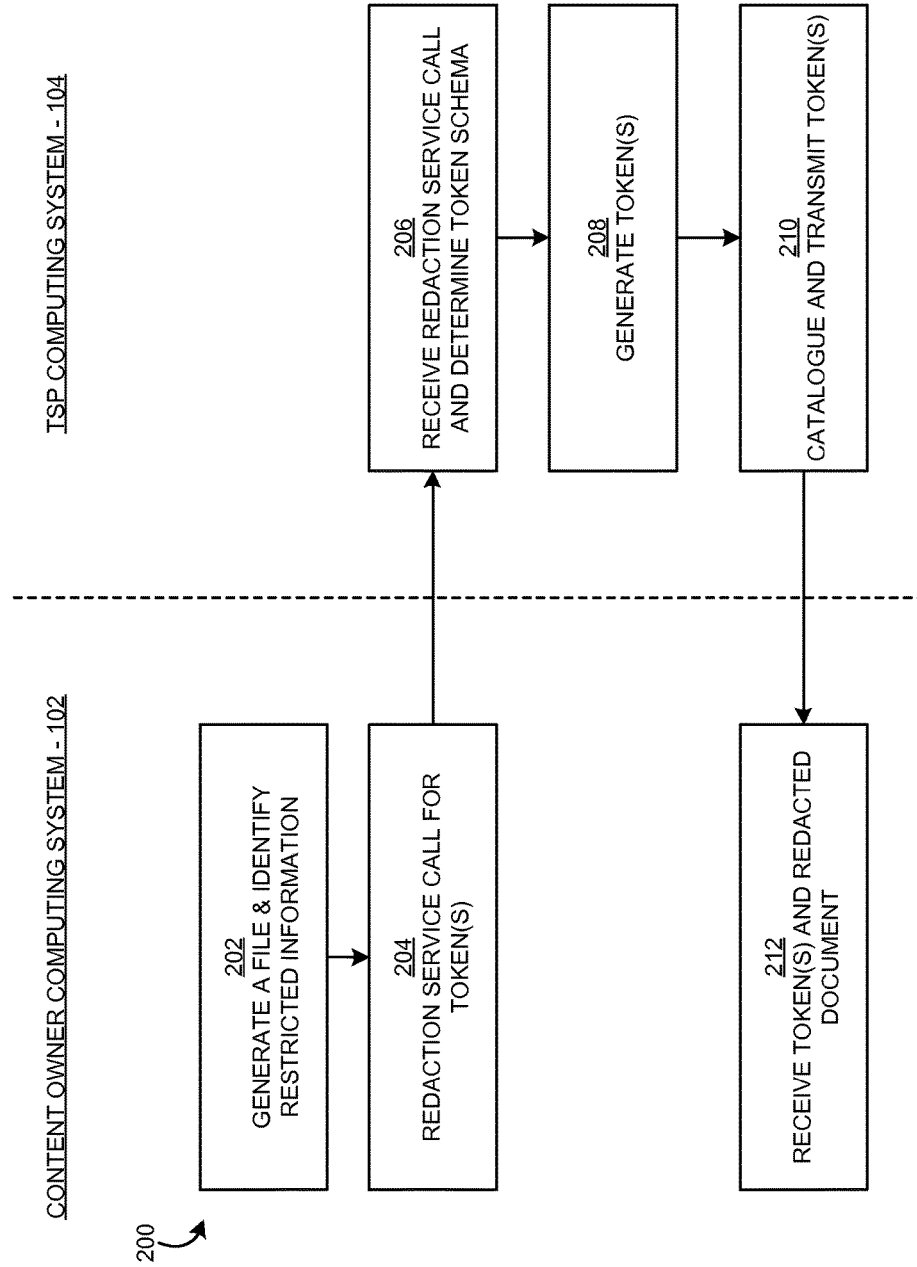
FIG. 2 is a flow diagram of a method of selectively tokenizing an arbitrary document at arbitrary points within the document, according to an example embodiment.

FIG. 2 is a flow diagram of a method 200 of selectively tokenizing a content owner's file, according to an example embodiment. The method allows for a content owner to upload a data file and determine exactly how the content in the file is redacted through tokenization (e.g., selecting content, randomizing the redaction, etc.) and what access controls are placed on the tokenized content (e.g., one password for all redacted content, each content has an specific access control, a biometric, a multi-factor authentication, etc.). The method 200 is in connection with a content owner (e.g., a subscriber to the TSPs services) and a TSP. For example, the content owner is an entity that operates the content owner computing system 102 of FIG. 1. The TSP is a TSP that manages the TSP computing system 104 of FIG. 1. However, the method 200 may be similarly performed by other systems and devices.

The method 200 begins when a file is selected to be redacted using the tokenization manifest at 202. The content owner computing system 102 identifies the file and determines what data elements are to be tokenized. The file may be of any type, for example, an excel document, JPEG, text document, pdf file, and the like. The tokenization manifest can dictate how the content owner identifies the data elements that need to be restricted. For example, the tokenization manifest may be pre-constructed to only allow the content owner redacting an image file to drag and click boxes over the content. Specifically, using an Abstract Syntax Notation One ("ASN.1") module to define an XML Manifest Type that uses XPath to located elements to be redacted. Alternatively, the tokenization manifest may be dynamic, allowing the content owner to choose a redaction method, which is implemented by the tokenization manifest. The identification may include a user-interface that allows for a point-click, drag and drop, or similar selection methods. Alternatively, the tokenization manifest may support identification through a detailed description (e.g., "please tokenize the head and neck of the middle person), a location-based (e.g., the second page of the text file will be tokenized), a coordinate pairing, or a similar identification mechanism. In some arrangements, the content owner may allow for the tokenization manifest to randomly redact content in the file. For example, the random redaction may be preferable where the content is sufficiently unusable or protected if any content is redacted.

At 204, the content owner computing system 102 generates and transmits a tokenization service call and the file to the TSP system computing system 104. The service call includes the identified data elements that are to be tokenized, a desired output for the tokens, and access level for each generated token. The identified data elements are the content in the file that the content owner chose to be restricted, at 202. The desired output for the tokens is what the content owner would like for the unrestricted data element to be replaced with. For example, the output could be a randomization redaction, blurring out, blacking out, whiting out, etc., of the original content. Additionally, the output could contain and HTTP GET/POST query string containing a URL that would access the TSP computing system 104. This string could be in the form of a clickable URL that is part of, or the entirety of, the token. An example is described in further detail below in FIG. 5. The service call also contains an access control value or access control information. The access control information is an identification of the level of access and identity of the entities that can access each piece of content. For example, the access control information may be multi-access, a list of authorized entities enrolled with the TSP, a single distributable passcode, or multiple distributable passcodes. This transmission of the service call and file may be generated in a dedicated application or through a web browser. In some arrangements, the transmission is in the form of sending the whole document with instructions, for which the TSP will eventually send back the tokenized document. In other arrangements, the service call is transmitted and the TSP will eventually return the tokenized values that will be placed in the document, either within the browser or within the application.

At 206, the TSP computing system 104 receives the service call and file from the content owner computing system 102. The tokenization manifest determines how to selectively encrypt the requested data elements of the file type. In some arrangements, the tokenization manifest is compiled on the application or browser accessible by the content owner computing system 102. In these arrangements, the TSP computing system 104 is in communication with the browser or application and is documenting and storing the tokenized values that are generated. The TSP computing system 104 associates each token with the level (s) of authentication. In other arrangements, the TSP computing system 104 receives a data package of the service call and file and subsequently determines which tokenization schemas (e.g., random number, hash, encryption, FPE) to implement, any additional XML Path attributes that need to be generated, and additional changes to the tokenization manifest to properly restrict the file and data elements. Alternatively, the tokenization manifest could assign & identify all the fields in the file and allow the content owner computing system 102 to subsequently select which identified fields are to be tokenized.

At 208, the TSP computing system 104 generates the tokens using the associated tokenization manifest. The generation of the tokens (e.g., tokenization) can include a variety of approaches. For example, the Encryption-based, Message Authentication Code-based ("MAC-based") and Static Table-driven ("STD") techniques, and the on-demand approach of On-demand random assignment ("ORDA") based techniques. In the case of ODRA techniques, tokens are generated when a plaintext is first presented to the tokenization service, the secret data is the plaintext/token pairing or any data that would indicate the plaintext/token pairing, and the random mapper is a pseudo-random number generator seeded from a strong entropy source. Encryption-based techniques use an encryption key as the secret data, and a format-preserving encryption function to generate tokens. MAC-based techniques are similar to Encryption-based techniques, but use a MAC-key as the secret data. STD techniques use a (set of) pre-generated static table(s) as the secret data, and use some function operating on the static table and PAN to generate the token.

The ODRA approach requires the use of a large table of plaintext/token pairings to be constantly updated and securely stored. For the Encryption-based, MAC-based and STD techniques, the secret data is a parameter of a function that defines a fixed plaintext/token pairing. There is no need for these techniques to keep a large table of plaintext/token pairings.

In some arrangements, the TSP computing system 104 analyzes the request and determines the proper tokenization manifest schema to generate tokens that comply with the service call. The TSP computing system 104 may need to add additional XML Path attributes, as determined at 206, to the manifest in order to generate the tokens. For example, the original document may already have field level identifiers which can be identified and have tokens generated for them. Alternatively, the document may be plaintext and have coordinate identifiers for the content that is to be tokenized, for example, a two dimensional coordinate system that marks the content to be redacted. In some arrangements, the TSP computing system 104 uses a tokenization manifest similar to the one described below in FIG. 6 and FIG. 7 to generate the tokens.

After the tokens are generated, the tokens are catalogued and transmitted, at 210, to the content owner computing system 102. In some arrangements, the tokenization manifest and/or tokens are digitally signed, for example, as outlined above in the generation circuit 124 of the TSP computing system 104 of FIG. 1. The tokens are stored in a token database that contains information relevant to the tokens. The information can include, the requesting entity (i.e., the content owner), a copy of the original file, the tokenization schema used, a tokenization manifest version, the associated authentication information, request times, and the like. In some arrangements, the TSP computing system 104 transmits the tokens to the content owner computing system 102 where an interface (e.g., dedicated application, web browser, etc.) replaces the original content in the file with the tokens, resulting in a tokenized file. In other arrangements, the TSP computing system 104 replaces the original content in the file with the tokens and transmits the tokenized file to the content owner computing system 102.

At 212, the content owner computing system 102 receives the generated tokens from the TSP computing system 104. The content owner computing system 102 has a redacted file in accordance with the content owner's service call at 204. The content owner computing system 102 may transmit the restricted file, with multiple access level tokens, to any receiving entity.

Figure 3:
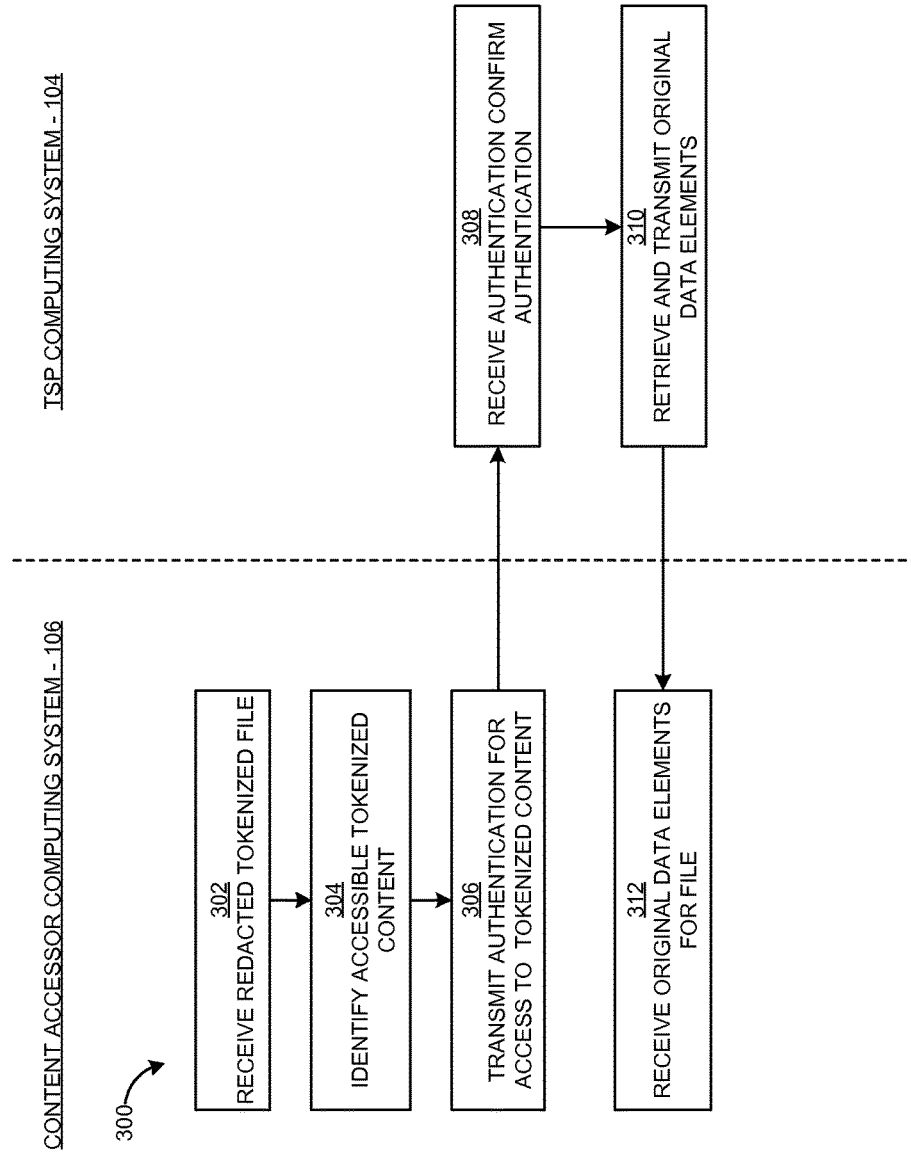
FIG. 3 is a flow diagram of a method of access control for detokenizing token(s), according to an example embodiment.

Referring to FIG. 3, a flow diagram of a method 300 of access control for detokenizing the redacted content in a tokenized file, according to an example embodiment. The method 300 may be performed in connection with the method 200 of FIG. 2. However, the method 300 may similarly be performed in connection with other types of transactions. The method 300 is shown in connection with a message content accessor and a TSP. For example, the message content accessor is an entity that operates the content accessor computing system 106 of FIG. 1. The TSP is an TSP that manages the TSP computing system 104 of FIG. 1. However, the method 300 may be similarly performed by other systems and devices.

The method 300 begins when a content accessor computing system 106 receives a redacted tokenized file from a content owner computing system 102 (not shown) at 302. Alternatively, the file could come from a computing system that has received the redacted file through multiple computing systems that originated with the file being sent from the content owner computing system 102. In other arrangements, the content accessor computing system 106 could access the file in a cloud service or shared repository that contains the tokenized redacted file. In either arrangement, the file contains one or more data elements redacted using a tokenization method. The file may have tokens generated from multiple TSPs, with each token having access information related to, or an identifier associated with, the TSP that generated that token. For example, a file may be tokenized by a first TSP at a first time and transmitted to the content owner computing system 102, and at a second time the content owner computing system 102 further redacts the file, using a second TSP, sending the twice redacted file to the content accessor computing system 106.

At 304, the content accessor computing system 106 identifies the accessible tokenized content. In some arrangements, the receiving entity opens the document in a file type-compatible program or in a dedicated browser or application associated with the tokenization service. In those arrangements, the interface may automatically identify the content that is tokenized or prompt the user to enter in authentication information to gain access to the tokenized content. In other arrangements, the document is open in a non-associated software program (e.g., Microsoft® Word, Paint, Adobe Acrobat®, etc.) and the tokenized values contain embedded, clickable URLs that will connect the receiving entity to the proper TSP computing system 104 and facilitate the authentication access.

At 306, the content accessor computing system 106 transmits authentication information to access the tokenized content. The authentication information may be, for example, a user name and password for access to the TSP, a username and password for a token, a token specific password, and the like. There may be one or more TSP entities depending on the flow/sharing of the document such that multiple requests are submitted with the associated authentication information provided to get access to the plaintext. The multiple TSP requests may be organized within the application or browser, if being used, providing the user with an interface that organizes the required information and transmits it to the proper TSPs. Alternatively, each token has an embedded request URL related to the TSP or tokenization redaction service that tokenized the content. The user selects and transmits the authentication information for each token.

At 308, the TSP computing system 104 receives the authentication information from the content accessor computing system 106 and confirms the authentication information. In some arrangements, this includes checking the authentication information for one or more tokens on the document against the authentication information stored for each of the token. In some arrangements, the content accessor computing system 106 provides a user name and password to confirm an identity with access to the TSP and then the TSP determines which, if any, of the tokens in the document the receiving entity has access to. In other arrangements, the tokens in the document have an associated password that must be provided to gain access to the tokens.

The TSP computing system 104 organizes the original data elements or un-redacted information associated with the authorized tokens at 310. The original data elements can include text, images, videos, audio, and the like. For example, words in a sentence, portions of a picture, portions of video, audio in a media file, etc. The detokenization of the tokens is dependent upon the technique used to tokenize (e.g., Encryption-based, MAC-based, STD techniques, ODRA approach, etc.) the plaintext data. For example, at 210 of method 200 of FIG. 2. In some arrangements, the TSP computing system 104 provides the full document with the authorized information detokenized. In other arrangements, the original data elements can be provided and, on the content accessor computing system 106 end, the original data elements replace the previously tokenized content. This replacement can be done on the content accessor computing system 106 either through a dedicated application, web-browser, or protocol sent to software that opened the file. In other arrangements, the TSP computing system 104 my "unlock" the missing parts of the file that already exist on the content accessor computing system 106. The TSP computing system 104 transmits the original data elements to the content accessor computing system 106 to complete 310.

At 312, the content accessor computing system 106 receives the authorized requested data elements detokenized in the file. The content accessor computing system 106 can subsequently tokenize the same or different data elements in the file, using the same or a different TSP. The method 300 can be carried out, on the back end, by a software interface used by the content accessor computing system 106. For example, the content accessor computing system 106 receives, at 302, in an email inbox a signed email that has been redacted using the tokenization manifest. Before it is presented to the user, the email application verifies the signature and identifies the encrypted piece, tokenized using the tokenization manifest, and the message type. The email application recognizes the message type as a tokenized data element from a specific TSP and will initiate a service call to the TSP with the authentication credentials of the user and receive the unrestricted content associated with the tokenized data elements. The user is presented with the unrestricted content replacing the tokenized elements at 312.

Figure 4B:
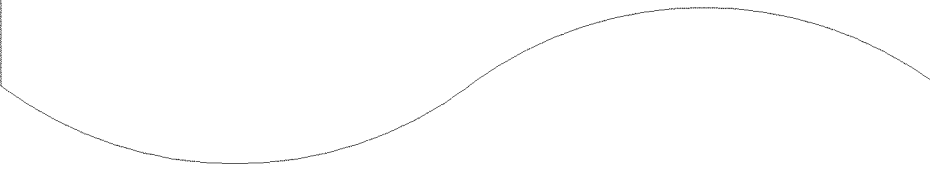

Referring to FIGS. 4A-4C, is an employment application at various instances through the tokenization methods described above, according to an example embodiment. The progression of the document includes being tokenized, for example, using method 200 of FIG. 2, and subsequently detokenized, for example, using method 300 of FIG. 3, by multiple entities. The figures refer to a hypothetical employment application 402 that is submitted to the hiring department of a corporation and shared on a public cloud. The application's sensitive content is tokenized before being placed on the cloud, retrieved from the cloud and detokenized by authorized entities, for example, the HR department of the company. The document is then tokenized again, redacting different information, to be shared outside of the corporation, for example, to confirm that the applicant did apply for a job at a certain time.

As shown in FIG. 4A, an employment application 402 submitted to ABC corporation for a potential job containing the original, unrestricted data elements. The document contains multiple information fields, the company name field 404, applicant information fields 406, form generation field 408 and comments field 410 regarding comments about the applicant's qualifications. The entity that is in possession of the employment application 402 submits a request to tokenize some filed entries of the application. This process can be similar to method 200 of FIG. 2. In some arrangements, the tokenization manifest could be a specific structured associated with a document such that the same information fields are tokenized every time. In other arrangements, the tokenization manifest may be implemented after the generation of the document; each information field being processed into a selectable data element that can be tokenized.

Turning to FIG. 4B, the redacted tokenized document is ready to be displayed on the shared server or location, for example, on a cloud interface or a blockchain. The sensitive information has been tokenized out so that unauthorized viewers cannot access the application specific information. The redacted document as shown has tokens generated for the applicant information fields 406 and the comment field 410. The document type 402, the company name field 404 and the form generation field 408 are not tokenized. The tokens have a random string of text and an embedded URL that a receiving entity may access to provide a link to the TSP to request the plaintext information. At FIG. 4B an authorized entity can access the employment application by locating the document number field 408 and submitting the authentication information to the TSP1 provider as indicated in the request submission URL. This process is similar to the method 300 described in FIG. 3.

Turning to FIG. 4C, an entity with access to the document can detokenize the document and then subsequently tokenize the same or different content fields using the same or a different TSP. As shown in FIG. 4C, the entity was authorized to view the entire document and decided to re-tokenize the comments field 412 using the TSP1 and to further tokenize the document in regards to the company name 404 using a TSP2. This could be because the entity in FIG. 4C would like to share the applicant information fields 406 of the employment application 402 with outside entities, but restrict the information regarding the applied for company 404 or the company's comments 412 on the applicant. For example, John Doe is being submitted as an applicant to a similar, but different company, to the "ABC Corporation" such that the entity sharing the information would like to give the details of the applicant without disclosing where the applicant has also applied to. This use would be beneficial for sharing resumes and employment applications on a central server, while allowing for company specific information to be redacted.

Figure 5:
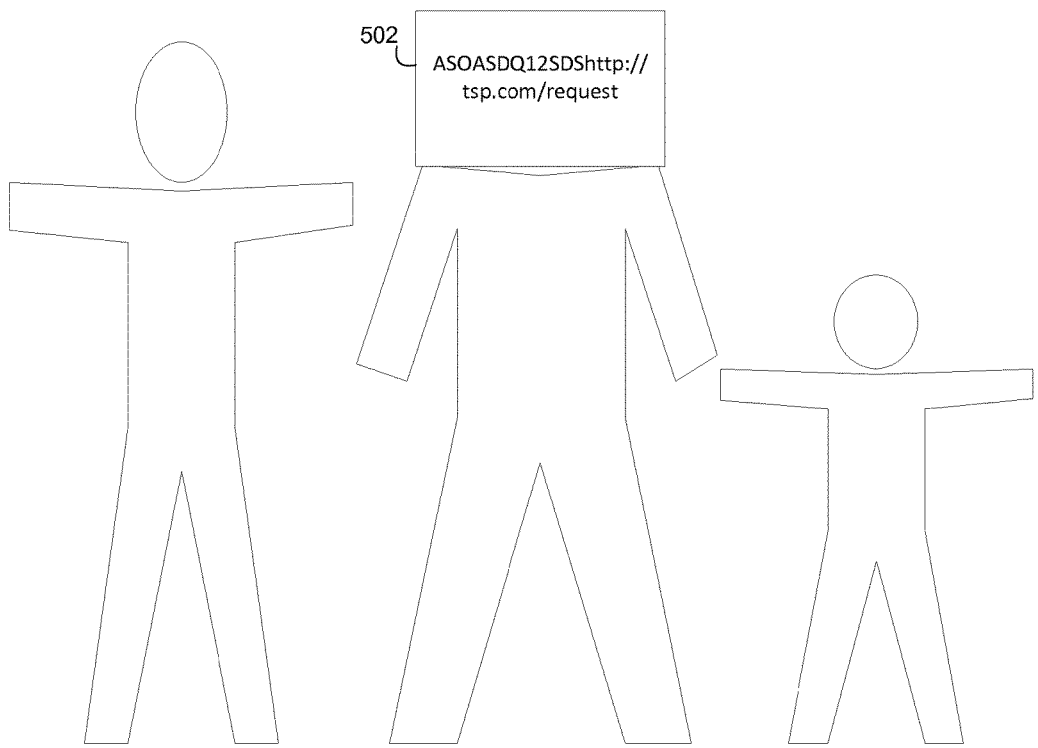
FIG. 5 is a JPEG file that has been processed using the tokenization redaction service system, according to an example embodiment.

Referring to FIG. 5, another implementation of the tokenization manifest, redacting information in a picture, is shown, according to an example embodiment. In this embodiment, the tokenization manifest supports a coordinate pairing selection to redact the information. For example, the manifest allows for an area to be described as a rectangle having the bounds relating to the coordinate pairs of [x1, y1], [x2, y2], [x3, y3], and [x4, y4]. To the user, the interface allows them to select an area to be boxed out, for example, by clicking and dragging out a shape that covers the areas that the user wants to tokenize. As shown in FIG. 5, the resulting token contains a token identifier string of "ASOASDQ12SDS" and a clickable request URL of "http://tsp.com/request." When the file is opened, the receiving party may click on the shaded tokenized area to initiate a detokenization request using, for example, method 300 of FIG. 3.

Referring to FIG. 6, an example tokenization manifest named TokenizedParts. TokenizedParts is a redaction tokenization manifest schema, of a SignedData message type, the content of which can be any type or format and can be signed with a set of attributes of any type of format, according to an example embodiment. The redaction tokenization manifest schema allows identification of tokenized content elements and supports detokenization processing. In order to ensure the manifest, list items are bound to the SignedData content under a digital signature and available for processing by the intended message content accessor. A list of tokenization components and a tokenization manifest must be included in the signed attributes component of SignedData. This cryptographic binding allows accidental or purposeful modification of the manifest to be detected by a signature verification process. The format and the information contained in the list can vary with the manifest item design and the type of content.

The TokenizedParts is defined using ASN.1 in accordance with the ISO/IEC 8824 Information Technology standard. To tokenize a document (e.g., file, image, etc.), XML Path ("XPath") expressions can be used to locate any tokenized element in any XML-instance document. To identify the tokenization components in an XML-instance document, a set of XPath expressions can be listed that identify the location of each tokenized element. When the contents of an XML element are tokenized, the content owner includes the outer markup tags in the input to the tokenization operation. These outer tags are not removed from the document, since they are used to locate the element using XPath. The markup between these outer tags is replaced with a character string representation of the tokenization results, a value of XML type base64Binary, which includes the XML tags that identify the tokenized value. This base64Binary XML schema type is used to represent arbitrary Base64-encoded binary data. The inputs are used to generate a service call to a TSP to generate tokens, for example, like the method 200 of FIG. 2. The entire document containing tokenization components and the associated manifest attribute are signed to cryptographically bind them under a digital signature. The signature prevents any part of the document or attributes from being substituted or modified without detection. Successful signature verification provides a relying party assurance of the authenticity of the document and manifest attribute.

To detokenize a redacted, tokenized document, a message content accessor uses the list of XPath expressions in the manifest to locate the XML tags in an XML-instance document that contains tokenized data. The signature on all tokenized objects in the manifest can then be verified using the signature on the SignedData content and signed attributes. The plaintext content of each tokenized object listed in the manifest can then be recovered by initiating a service call to the appropriate TSP, for example, like the method 300 of FIG. 3. The recovered tokenized object plaintext can then be used to replace the tokenized value in with XML-instance document with the recovered XML markup and plaintext version of the initial XML element prior to XML schema validation.

Expanding on the XPath elements of the schema, the manifest list items are a value of type XPathTokenSet and a list of values of type XPathTokenSetItems. Both XPathTokenSet and XPathTokenSetItems contain two components: tSP and xPathSet. The tSP component is a Hypertext Transfer Protocol or Hypertext Transfer Protocol over Secure Sockets Layer URL scheme that identifies the location of a TSP. It also contains the format of the parameters needed to recover the original content of a tokenized value. The process would include loading the image into a buffer, such that the upper left coordinate is set at (0, 0) and bottom right coordinate is (X, Y). The process is completed after cycling though the list of <ImageTokensSetItems> and redacting the areas given by the X,Y coordinate pairs. Using this format a set of arbitrary rectangles is located in the image and protects confidentiality of those areas using tokenization.

Referring to FIG. 7, a tokenization schema for properly generating and processing nested tokens. The nested tokens include original content that is tokenized multiple times, either by the same or a different TSP, and in a single or multiple tokenization requests. For example, the original content may be tokenized twice, using two different authentication passwords to provide multiple layers of security. Another example is tokenizing already tokenized PAN numbers for a plurality of credit card holders, the innermost value being the actual payment card number. To accomplish this process a first token would be created for a cardholder using the cardholder payment card value as input to the tokenization process. The first token would be an input to the tokenization process to create a second token. This would result in a nested token, the second token whose plaintext value returned from a detokenization process would be the first token. Further detokenization of the first token would return the initial plaintext cardholder payment value.

As shown in the schema in FIG. 7, an ASN.1 schema that has a defined type Token as a simple opaque string of hexadecimal digits having no discernible structure, and with the functionality to contain a structure embedded in the string of octets that could be processed after ASN.1 message encoding or decoding. To support nested tokens that comports with the X9.73 standard, the value for the token is set "Token::=OCTET STRING (CONTAINING NestedTokens)." The NestedTokens sequence includes a tokenDepth and a tokenSet value. The schema may be used as part of the tokenization manifest described in FIG. 6.

To create a token that contains an iteratively-created nested set of token values, the NestedTokens is generated by setting the value of tokenSet. The tokenSet value identifies the number of nested tokens for a data element, whereby the encoded value would become the value of the type Token. For example, if two nested tokens are desired, the tokenSet value would be set to two and the Token would have a value of two. To decode a nested token, the content accessor would first decode the Token value into a value of type NestedTokens. Based on the value of the tokenDepth component of type NestedTokens, the content accessor would 'unwrap' the tokenSet value by making the number of calls to aTSP that corresponds to the value. For example, if the Token value is two, two service calls are made to the TSP. The value returned from the first call to the TSP would be input to the 2nd call to the TSP and the innermost token value of the set of nested token values would be recovered. Alternately, to generate a single token (not a nested token) the type Token would be created by setting tokenSet to the generated token value of something that had been tokenized, then encoding a value of type NestedTokens using a default tokenDepth of 1. This encoded value would become the value of type Token.

The arrangements described herein have been described with reference to drawings. The drawings illustrate certain details of specific arrangements that implement the systems, methods and programs described herein. However, describing the arrangements with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some arrangements, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some arrangements, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some arrangements, the one or more processors may be embodied in various ways. The one or more processors may be constructed in a manner sufficient to perform at least the operations described herein. In some arrangements, the one or more processors may be shared by multiple circuits (e.g., circuit A and circuit B may comprise or otherwise share the same processor which, in some example arrangements, may execute instructions stored, or otherwise accessed, via different areas of memory). Alternatively or additionally, the one or more processors may be structured to perform or otherwise execute certain operations independent of one or more co-processors. In other example arrangements, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some arrangements, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An example system for implementing the overall system or portions of the arrangements might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some arrangements, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other arrangements, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example arrangements described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative arrangements. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps.

The foregoing description of arrangements has been presented for purposes of illustration and description. It is not intended to be exhaustive or to limit the disclosure to the precise form disclosed, and modifications and variations are possible in light of the above teachings or may be acquired from this disclosure. The arrangements were chosen and described in order to explain the principals of the disclosure and its practical application to enable one skilled in the art to utilize the various arrangements and with various modifications as are suited to the particular use contemplated. Other substitutions, modifications, changes and omissions may be made in the design, operating conditions and arrangement of the arrangements without departing from the scope of the present disclosure as expressed in the appended claims.

What is claimed:

1. A method comprising:
receiving, by a tokenization service provider computing system, a file and a redaction service call, the redaction service call including selected file content and access information;
generating, by the computing system, a tokenization manifest, the tokenization manifest including the selected file content, and a tokenization schema;
tokenizing, by the computing system, the selected file content using the tokenization schema, the tokenization schema replacing the unrestricted file content into a corresponding restricted token,
wherein the selected file content is a previously tokenized value, wherein the tokenization process generates a nested token, and the nested token has a tokenSet value, the tokenSet value being a number of nested tokens for the information object identifier;
receiving, by the computing system, an access request, the access request a result of accessing a URL embedded in the token, the access request comprising authentication information, the file, and one or more requested tokens to be converted to the unrestricted file content;
retrieving, by the computing system, the access information associated with each requested token;
comparing, by the computing system, the authentication information to the access information;
extracting, by the computing system, the value of tokenSet in the nested token; and
detokenizing, by the computing system, the nested token for a number of iterations, the number of iterations being equal to the tokenSet, and wherein an output of the detokenization for each iteration is an input for the subsequent iteration of detokenization until the number of iterations equals tokenSet.

2. The method of claim 1, wherein the tokenization schema is a user-specified tokenization schema, wherein the user-specified tokenization schema includes a user determining the selected file content and an output for the selected file content.

3. The method of claim 1, wherein the tokenization schema is a random tokenization schema, wherein the random tokenization schema includes a random determination of the selected file content and an output for the selected file content.

4. The method of claim 1, further comprising:
receiving, by the computing system, an access request, the access request a result of accessing a URL embedded in the token, the access request comprising authentication information, the file, and a token to be converted to the unrestricted file content;
retrieving, by the computing system, the access information associated with the token;
comparing, by the computing system, the authentication information to the access information; and
detokenizing, by the computing system, the token in the file.

5. The method of claim 1, further comprising, transmitting, by the computing system, a digitally signed message, the digitally signed message including a cryptographic binding of a hash of the file and the restricted token.

6. The method of claim 1, wherein the access information includes a user identifier and a password for each generated token in the file.

7. The method of claim 1, wherein the token is an output of at least one of: blurred, blocked out, a replacement string, a token number, or a clickable request link.

8. The method of claim 1, the selected file content is a coordinate system being X-axis and Y-axis coordinates that define a boundary of an area to be tokenized.

9. A system, comprising:
a network interface;
a redaction tokenization system comprising a processor and instructions stored in non-transitory machine-readable media, the instructions configured to cause the redaction tokenization system to:

receive a file and a redaction service call, the redaction service call including selected file content and access information;
generate a tokenization manifest, the tokenization manifest including the selected file content, and a tokenization schema;
tokenize the selected file content using the tokenization schema, the tokenization schema replacing the unrestricted file content into a corresponding restricted token,
wherein the selected file content is a previously tokenized value, wherein the tokenization process generates a nested token, and the nested token has a tokenSet value, the tokenSet value being a number of nested tokens for the information object identifier;
receive an access request, the access request a result of accessing a URL embedded in the token, the access request comprising authentication information, the file, and one or more requested tokens to be converted to the unrestricted file content;
retrieve, the access information associated with each requested token;
compare the authentication information to the access information;
extract the value of tokenSet in the nested token; and
detokenize the nested token for a number of iterations, the number of iterations being equal to the tokenSet, and wherein an output of the detokenization for each iteration is an input for the subsequent iteration of detokenization until the number of iterations equals tokenSet.

10. The system of claim 9, wherein the tokenization schema is a user-specified tokenization schema, wherein the user-specified tokenization includes a user determining the selected file content and an output for the selected file content.

11. The system of claim 9, wherein redaction service call further includes, a random tokenization schema, wherein the random tokenization includes a random determination of the selected file content and an output for the selected file content.

12. The system of claim 9, wherein the processor is further configured to cause the redaction tokenization system to:
receive an access request, the access request a result of accessing a URL embedded in the token, the access request comprising authentication information, the file, and a token to be converted to the unrestricted file content;
retrieve the access information associated with the token;
compare the authentication information to the access information; and
detokenize the token in the file.

13. The system of claim 9, wherein the processor is further configured to cause the redaction tokenization system to:
transmit a digitally signed message, the digitally signed message including a cryptographic binding of a hash of the file and the restricted token.

14. The system of claim 9, wherein the access information includes a user identifier and a password for each generated token in the file.

15. The system of claim 9, wherein the token is an output of at least one of: blurred, blocked out, a replacement string, a token number, or a clickable request link.

16. The system of claim 9, wherein the selected file content is a coordinate system being X-axis and Y-axis coordinates that define a boundary of an area to be tokenized.

* * * * *